Jan. 18, 1927.
E. C. BAETHE
1,614,590
PULVERIZER ATTACHMENT FOR CULTIVATORS
Filed Oct. 29, 1923    2 Sheets-Sheet 1
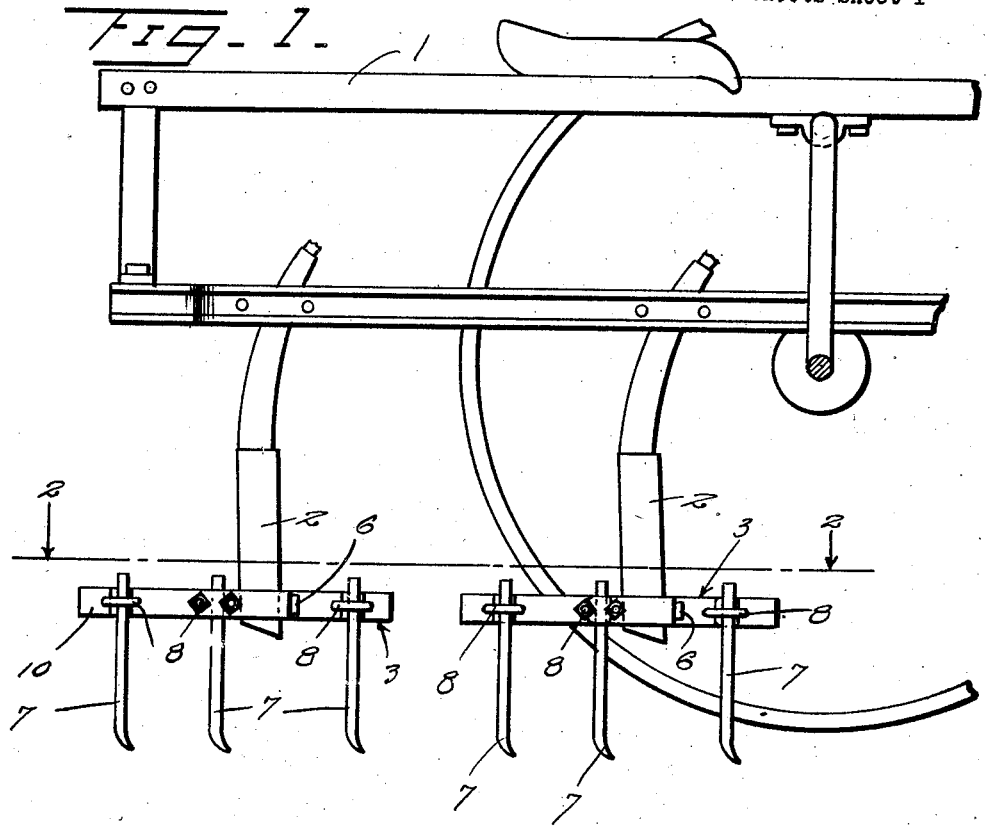
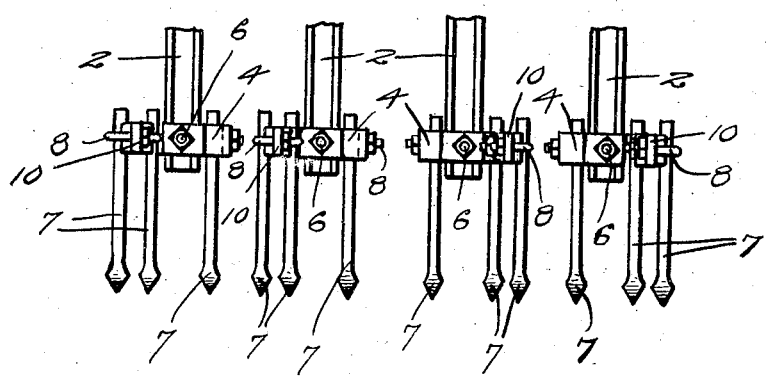
Inventor
E. C. Baethe.
By Jaerli & Jaerli
Attorneys Jan. 18, 1927. 1,614,590
E. C. BAETHE
PULVERIZER ATTACHMENT FOR CULTIVATORS
Filed Oct. 29, 1923 2 Sheets-Sheet 2
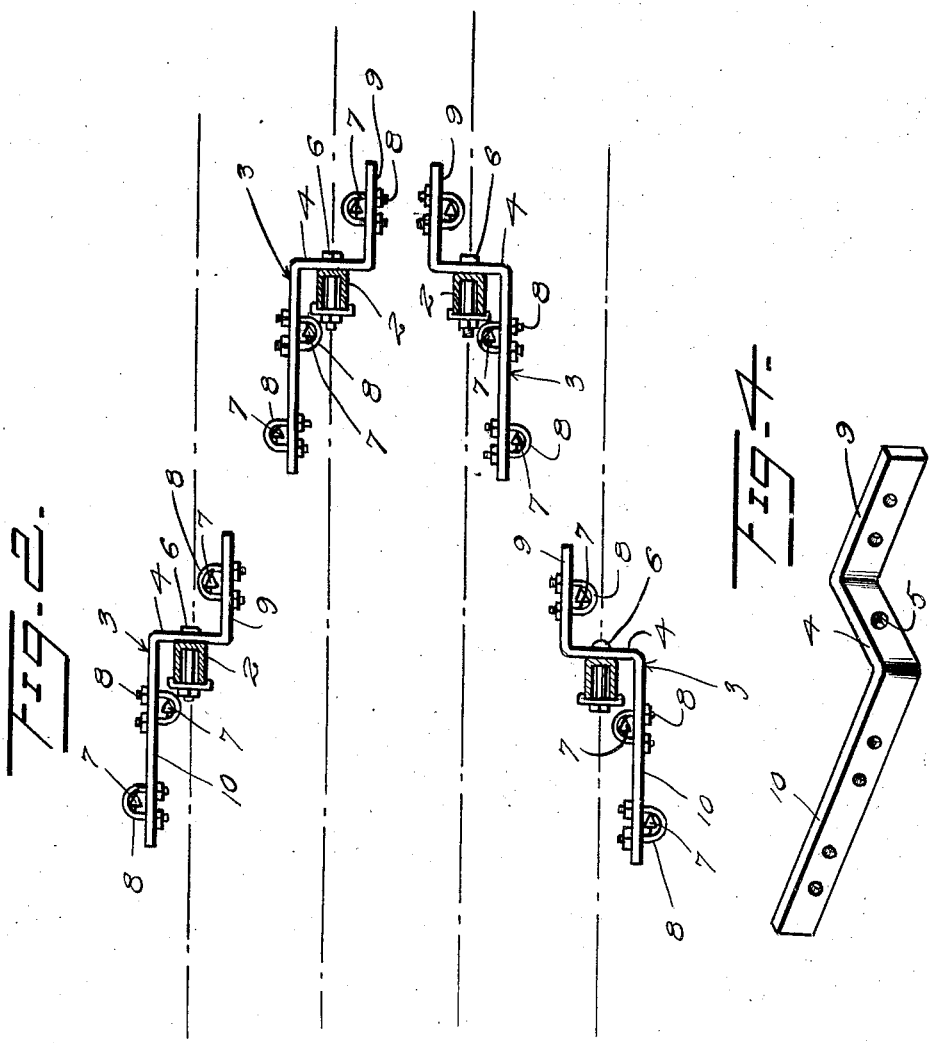
Inventor
E. C. Baethe
By Jacobi & Jacobi
Attorneys Patented Jan. 18, 1927.

1,614,590

UNITED STATES PATENT OFFICE.

EDWARD C. BAETHE, OF WALLER, TEXAS.

PULVERIZER ATTACHMENT FOR CULTIVATORS.

Application filed October 29, 1923. Serial No. 671,507.

This invention relates to a pulverizer attachment for a cultivator and has for its principal object to provide a simple and efficient means which may be easily and readily attached to a standard cultivator of the well known construction and which will provide for the proper pulverizing of the ground over which the cultivator travels.

Another important object of the invention is to provide a pulverizer attachment which may be used in conjunction with the sweeps ordinarily mounted upon the cultivator thereby accomplishing the pulverizing of the earth simultaneously with the operation of the sweeps.

Another object of the invention is to provide a pulverizer attachment wherein the harrow teeth associated with the pulverizer are arranged in such a manner as to cause the pulverizing of the ground in as wide a row as is desired.

A still further object of the invention is to provide a pulverizer of the attachment of the above mentioned character, which is simple in construction, inexpensive, strong and durable and further well adapted for the purposes for which it is designated.

Other objects and advantages of this invention will become apparent during the course of the following description.

In the accompanying drawings forming a part of this specification and in which like numerals designate like parts throughout the same:

Figure 1 is a side view of a portion of a cultivator showing my pulverizer attachment in position thereon, and Figure 2 is a horizontal section taken on the line 2—2 of Figure 1.

Figure 3 is a rear elevation.

Figure 4 is a perspective view of one of the bars.

In the drawings, wherein for the purpose of illustration is shown the preferred embodiment of my invention, the numeral 1 designates a standard cultivator of any well known construction and as the same forms no important part in the present invention it is not thought to be necessary to further go in detail relative to the same. In the present invention the sweeps which are ordinarily mounted on the lower ends of the feet 2 of the cultivator are removed and the units comprising my pulverizer attachment are secured to the feet in a manner as will hereinafter be more fully described.

Each unit of my pulverizer attachment comprises an elongated bar of any suitable material preferably steel as indicated by the numeral 3 in the drawing. As each unit is of substantially the same construction the description of one of these units is thought to suffice for the description of all. The elongated bar 3 is bent at right angles adjacent its forward end to provide the offset portion 4. The purpose of this construction is to provide a means for permitting each unit to be detachably connected to the lower end of feet 2 of the cultivator and this feature is accomplished by providing the offset portion therefore with a suitable aperture 5 which will register with the aperture provided on the lower end of each of the feet and will permit a bolt or other suitable fastening means such as designated by numeral 6 in the drawing to pass through the registering aperture in the offset portion and the feet whereby each unit may be detachably connected to the feet of the cultivator.

As the forward portion of the elongated bar 3 is of a shorter length than the rear portion due to the formation of the offset 4, it will be readily seen that only one harrow tooth such as is designated by the numeral 7 is adapted to be secured thereto and to this purpose I provide the U-shaped clamping means 8 whereby the harrow tooth may be secured in proper supported position upon the forward end 9 of the bar 3. The rear portion 10 of the bar 3 is adapted to support a pair of harrow teeth of the same construction as the harrow tooth 7 mounted upon the forward end 9 of the bar 3 and as is clearly illustrated in the drawing it will be seen that the harrow teeth are arranged in such a manner as to have one of the teeth secured adjacent the outer end of the bar on one side face of the same while the other harrow tooth is secured adjacent the offset portion 4 and on the opposite side face of the rear portion 10 of the bar. It is to be further understood that the same fastening means is provided for securing the harrow teeth on the rear portion of the elongated bar as is used for securing the harrow tooth on the forward portion of the bar.

In use, there are four of these units and they are adapted to be used in pairs so that one pair is secured to the forward feet and the other pair are secured to the rear feet of the cultivator and when connected thereto it will be seen that the units are so arranged as to converge toward the forward end of the cultivator and permits the harrow teeth to extend over the entire width of the row to be cultivated. If desired only two of the pulverizing units may be used and the usual sweeps may be mounted upon the forward or rear feet of the cultivator as the case may be thereby permitting the pulverizer to operate simultaneously with the sweeps. However a better mulch is formed by using all of the units of the pulverizer when the device is used in the cultivation of young growing plants.

By detachably supporting each of the pulverizing units on the sweep supporting feet of the cultivator there is no adjustment to be made in order to provide for the proper operation of the pulverizer attachment. Furthermore when it is not desired to use the pulverizing attachment when same is secured to the cultivator the usual lifting means which is associated with the sweeps supporting feet may be actuated to raise the feet into an inoperative position thereby raising the harrow teeth carried by each of the pulverizing units out of engagement with the ground.

The simplicity in which my device is adapted to be secured upon a cultivator enables the same to be readily and easily attached thereto and furthermore will not prevent the proper operation of the sweeps if the same are placed in use. If any of the harrow teeth should accidentally become broken, the same may be replaced by loosening the clamping means and replacing the same with a new tooth thereby obviating the necessity of having to buy an entirely new unit which would cost considerably more than one harrow tooth.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion, and in the minor details of construction may be resorted to, without departing from the the spirit or sacrificing any of the principles of the invention.

What I claim is:—

A cultivator attachment comprising a substantially Z-shaped bar having a relatively short intermediate portion and relatively long end portions, one of the end portions being longer than the other and the end portions being parallel with relation to each other, the intermediate portion being provided at its center with an opening adapted to receive a securing device, means carried by the shorter end portion for securing a soil engaging member at the side thereof and means mounted at spaced points upon the longer end portion and adapted to secure soil engaging members at the opposite side surfaces of the said longer end portion.

In testimony whereof I affix my signature.

EDWARD C. BAETHE.